US006906624B2

(12) United States Patent
McClelland et al.

(10) Patent No.: US 6,906,624 B2
(45) Date of Patent: Jun. 14, 2005

(54) METHOD AND APPARATUS FOR A REMOTE TIRE PRESSURE MONITORING SYSTEM

(75) Inventors: Thomas David Stephen McClelland, Craigavon (GB); David Samuel Porter, County Antrim (GB); Alastair Thomas Johnston, Belfast (GB)

(73) Assignee: Schrader-Bridgeport International, Inc., Deerfield, IL (US)

( * ) Notice: Subject to any disclaimer, the term of this patent is extended or adjusted under 35 U.S.C. 154(b) by 0 days.

(21) Appl. No.: 10/767,360

(22) Filed: Jan. 29, 2004

(65) Prior Publication Data

US 2004/0183664 A1 Sep. 23, 2004

Related U.S. Application Data

(63) Continuation of application No. 09/245,938, filed on Feb. 5, 1999, now Pat. No. 6,710,708.

(51) Int. Cl.[7] ............................................. B60C 23/02
(52) U.S. Cl. ..................................... 340/442; 340/448
(58) Field of Search .......................... 340/442, 443–448; 73/146.2, 146.3, 146.4, 146.5

(56) References Cited

U.S. PATENT DOCUMENTS

| | | |
|---|---|---|
| 3,806,905 A | 4/1974 | Strenglein |
| 4,067,235 A | 1/1978 | Markland et al. |
| 4,262,632 A | 4/1981 | Hanton et al. |
| 4,450,431 A | 5/1984 | Hochstein |
| 4,574,267 A | 3/1986 | Jones |
| 4,609,905 A | 9/1986 | Uzzo |
| 4,918,423 A | 4/1990 | Fukuyama et al. |
| 5,083,457 A | 1/1992 | Schultz |
| 5,084,699 A | 1/1992 | DeMichele |
| 5,109,213 A | 4/1992 | Williams |

(Continued)

FOREIGN PATENT DOCUMENTS

| | | |
|---|---|---|
| DE | 100 12 458 A1 | 9/2001 |
| EP | 0 760 299 B1 | 3/1999 |
| GB | 2 316 209 A | 2/1998 |
| WO | WO 01/69265 A1 | 3/2001 |

OTHER PUBLICATIONS

Examination Report for Canadian Application No. 2,294,694, dated Mar. 30, 2004, 5 pages.
Memsic, Inc. brochure titled "Low Cost ±1 g Dual Axis Accelerometer with Analog Outputs—MXA2500A", Jan., 2002, pp. 1–8.
Memsic, Inc. brochure titled "Application Note #AN–00MX–001: The Fundamentals", undated but prepared prior to Apr. 18, 2002, pp. 1–3.
International Search Report in International Application No. PCT/US03/11582, dated Aug. 11, 2003, 4 pages.

*Primary Examiner*—Toan N. Pham
(74) *Attorney, Agent, or Firm*—Brinks Hofer Gilson & Lione

(57) ABSTRACT

A tire characteristic monitoring method allows automatic programming of tire position information in a remote tire pressure monitoring system (10). The method includes, from a remotely located exciter (16) using a primary coil (18) to transmit a relatively low frequency signal to a secondary coil (L1) of a tire monitor (12) associated with a tire of a vehicle. The method further includes the step of, at the tire monitor, in response to the relatively low frequency signal, transmitting a relatively high transmitting signal to convey data. The data are received at the exciter and subsequently loaded into a receiving unit (14) of the vehicle.

17 Claims, 4 Drawing Sheets

U.S. PATENT DOCUMENTS

| | | |
|---|---|---|
| 5,231,872 A | 8/1993 | Bowler et al. |
| 5,483,827 A | 1/1996 | Kulka et al. |
| 5,559,484 A | 9/1996 | Nowicki et al. |
| 5,562,787 A | 10/1996 | Koch et al. |
| 5,589,815 A | 12/1996 | Nishihara et al. |
| 5,600,301 A | 2/1997 | Robinson, III |
| 5,602,524 A | 2/1997 | Mock et al. |
| 5,612,671 A | 3/1997 | Mendez et al. |
| 5,673,018 A | 9/1997 | Lowe et al. |
| 5,721,528 A | 2/1998 | Boesch et al. |
| 5,731,754 A | 3/1998 | Lee, Jr. et al. |
| 5,742,618 A | 4/1998 | Lowe |
| 5,764,138 A | 6/1998 | Lowe |
| 5,774,047 A | 6/1998 | Hensel, IV |
| 5,801,322 A | 9/1998 | Laine et al. |
| 5,838,229 A | 11/1998 | Robinson, III |
| 5,874,896 A | 2/1999 | Lowe et al. |
| 5,880,363 A | 3/1999 | Meyer et al. |
| 5,883,305 A | 3/1999 | Jo et al. |
| 5,889,471 A | 3/1999 | Glehr et al. |
| 5,905,444 A | 5/1999 | Zimmer |
| 5,936,527 A | 8/1999 | Isaacman et al. |
| 5,945,908 A | 8/1999 | Nowicki et al. |
| 6,018,993 A | 2/2000 | Normann et al. |
| 6,034,597 A | 3/2000 | Normann et al. |
| 6,062,072 A | 5/2000 | Mock et al. |
| 6,112,585 A | 9/2000 | Schrottle et al. |
| 6,112,587 A | 9/2000 | Oldenettel |
| 6,127,928 A | 10/2000 | Issacman et al. |
| 6,181,241 B1 | 1/2001 | Normann et al. |
| 6,204,758 B1 | 3/2001 | Wacker et al. |
| 6,218,936 B1 | 4/2001 | Imao |
| 6,243,007 B1 | 6/2001 | McLaughlin et al. |
| 6,252,498 B1 | 6/2001 | Pashayan, Jr. |
| 6,257,289 B1 | 7/2001 | Tomita et al. |
| 6,259,361 B1 | 7/2001 | Robillard et al. |
| 6,271,748 B1 | 8/2001 | Derbyshire et al. |
| 6,278,363 B1 | 8/2001 | Bezek et al. |
| 6,304,172 B1 | 10/2001 | Katou et al. |
| 6,307,517 B1 | 10/2001 | Lee |
| 6,340,930 B1 | 1/2002 | Lin |
| 6,384,720 B1 | 5/2002 | Juzswik et al. |
| 6,414,592 B1 | 7/2002 | Dixit et al. |
| 6,441,727 B1 | 8/2002 | LeMense |
| 6,441,728 B1 | 8/2002 | Dixit et al. |
| 6,446,502 B1 | 9/2002 | Normann et al. |
| 6,489,888 B1 | 12/2002 | Honeck et al. |
| 6,518,875 B2 | 2/2003 | DeZorzi |
| 6,518,876 B1 | 2/2003 | Marguet et al. |
| 6,543,279 B1 | 4/2003 | Yones et al. |
| 6,581,449 B1 | 6/2003 | Brown et al. |
| 2001/0002451 A1 | 5/2001 | Breed |

METHOD AND APPARATUS FOR A REMOTE TIRE PRESSURE MONITORING SYSTEM

RELATED APPLICATIONS

The present application is a continuation of application Ser. No. 09/245,938, filed Feb. 5, 1999, now U.S. Pat. No. 6,710,708 which is hereby incorporated herein in its entirety by this reference.

BACKGROUND

The present invention is generally related to a method and apparatus for monitoring characteristics of a tire in a vehicle.

Systems have been developed to monitor a characteristic such as tire pressure of a vehicle and to report the characteristic to a receiver at a central monitoring station using radio transmissions. A monitor is located at each tire and periodically takes a measurement of the tire characteristic. The monitor then transmits the results of the measurement in a radio frequency transmission to the central monitoring station which produces an alarm or a display in response to the measurement.

One problem with such systems has been the need to program the location of the transmitters at the central station. To be fully useful, the tire characteristic data is preferably associated with the tire which originated the measurement when presenting a display or alarm. Each monitor includes identification information which can be transmitted with the measurement. The tire monitor is preferably activated to produce this information and the information is then conveyed to the central station and associated with the position of the tire.

In one technique, the tire monitors each include a reed switch or other magnetic device. A magnet is passed near the reed switch, causing the monitor to transmit a radio frequency transmission that includes identification data. A service technician repeats this process at each wheel and then loads the identification and position information into the central monitoring station. Another method provides a printed bar code on each tire monitor which contains the identification information and which may be read with a suitable bar code reader.

These previous techniques have been limited in effectiveness. The magnetic programming technique may be subject to interference and crosstalk, for example in a factory where many such tire monitors are being assembled with tires and vehicles. The bar code label system requires a label at each tire which can be lost or become dirty or illegible.

A further limitation of these techniques is the manual operation requiring activation by a service technician. A system is desired which automatically conveys wheel position data to the receiver. Such a system would be particularly useful after any change in tire position, such as tire rotation or replacement of a tire.

BRIEF SUMMARY

The present invention is directed to an improved remote tire pressure monitoring system which is readily programmable. By way of introduction only, in one embodiment, each tire monitor includes a switch which is activated by detection of a relatively low frequency signal transmitted from a nearby exciter. In response to the low frequency signal, the detector transmits tire characteristic data including identification information. The identification information is received at the exciter and subsequently loaded into the receiver of a vehicle. This reduces radio frequency interference and crosstalk. The exciter may be manually operable or automatically controlled, which permits automatic tire pressure monitor position programming.

The foregoing discussion of the preferred embodiments has been provided only by way of introduction. Nothing in this section should be taken as a limitation on the following claims, which define the scope of the invention.

DETAILED DESCRIPTION OF THE DRAWINGS AND THE PRESENTLY PREFERRED EMBODIMENTS

Figure 1:
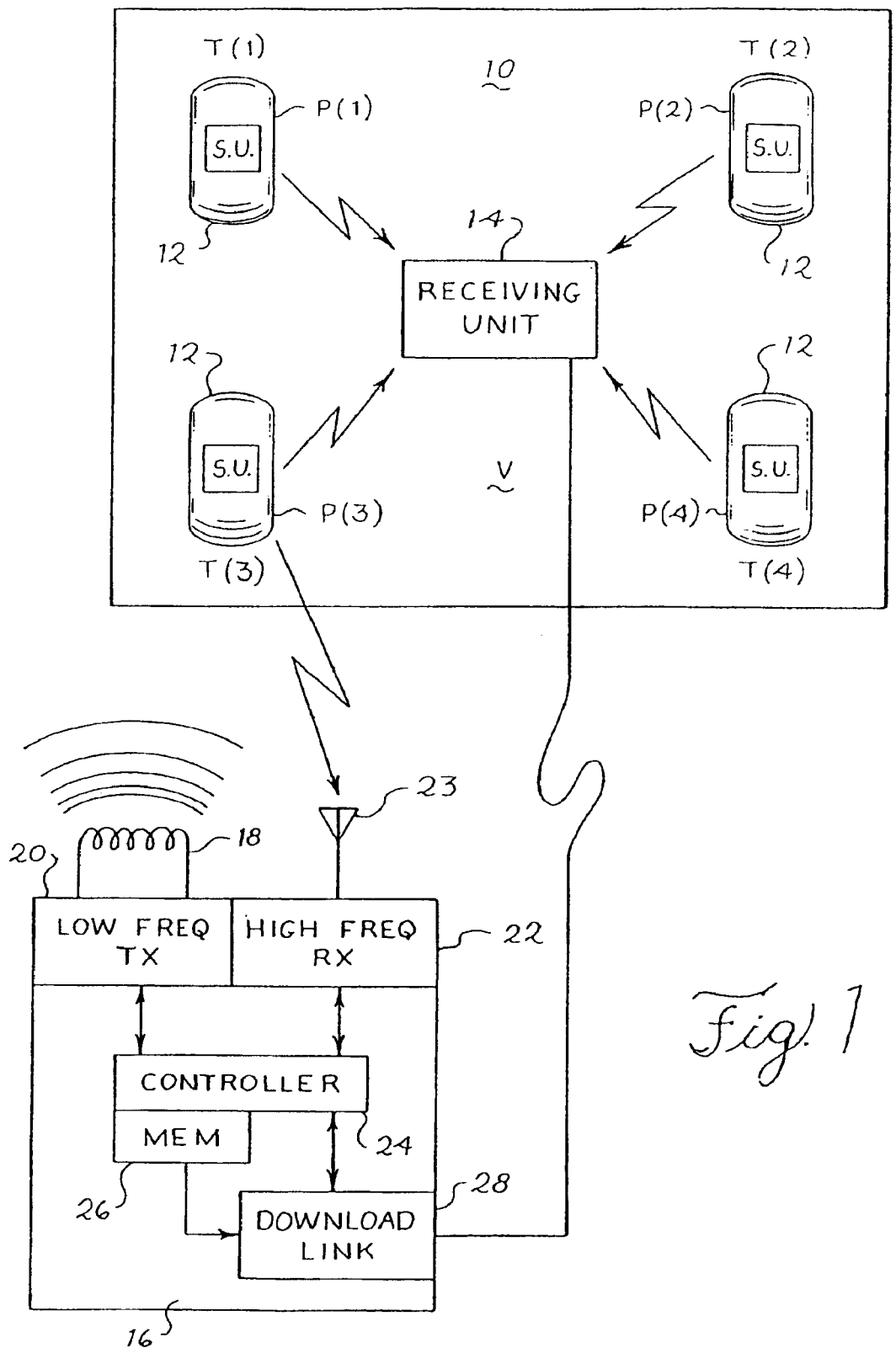
FIG. 1 is a block diagram of a remote tire pressure monitoring system.

Referring now to the drawings, FIG. 1 shows a block diagram of a remote tire pressure monitoring system 10. FIG. 1 shows a vehicle V that includes in this example four tires and an exciter 16 for collecting tire monitor information. The vehicle V includes a remote tire pressure monitoring system 10 that in this example includes four sending units or tire monitors 12 and a receiving unit 14. Each of the sending units 12 includes a battery powered, radio frequency transmitter that periodically transmits radio frequency signals indicative of a tire characteristic such as tire pressure in the associated tire. In this example, the tires are labeled T(1), T(2), T(3), T(4), and the associated tire pressures are identified as P(1), P(2), P(3), P(4). The receiving unit 14 receives radio frequency signals from the tire monitors 12 and provides a warning to the operator of the vehicle V when the indicated tire pressure of any of the tires is outside a predetermined range.

The system 10 further includes one or more exciters, such as exciter 16. The exciter 16 includes a low frequency transmitter circuit 20 which drives a primary coil 18, a high frequency receiver circuit 22, a controller 24, a memory 26 and a download link 28.

The exciter 16 is configured for placement near the tire monitors 12 for collecting tire monitor information. The low frequency transmitter circuit 20 in combination with the primary coil 18 generates a relatively low frequency signal. In one embodiment, the low frequency signal has a frequency of approximately 125 KHz, but other frequencies or ranges of frequencies may be suitable. A secondary coil inside a tire monitor 12 detects the low frequency signal. When the primary coil 18 is energized by the low frequency signal at suitable amplitude and with a correctly tuned primary coil, significant energy is transmitted across an air gap between the primary coil 18 and the secondary coil within an adjacent tire monitor 12. The exciter 16 only activates those tire monitors that are in close proximity, e.g., within one meter of the exciter 16. The secondary coil resonates due to the applied low frequency energy. In the preferred embodiment, the adjacent tire monitor 12 includes a switch which is designed to detect this energy and cause the tire monitor 12 to produce a suitable response. Further details on the operation of the tire monitor 12 will be provided below in connection with FIGS. 3 and 4.

In the illustrated embodiment, the tire monitor 12 responds to the low frequency signal from the exciter 16 by transmitting data to the exciter 16. The data preferably includes identification information for the tire monitor 12. The identification information, along with position information identifying the position of the tire monitor 12 on the vehicle V, is subsequently conveyed from the exciter 16 to the receiving unit 14.

The transmission from the tire monitor 12 is received at an antenna 23 associated with the high frequency receiver circuit 22 of the exciter 16. The high frequency receiver circuit 22 extracts identification information contained in the transmission. The identification information is stored in the memory 26 and associated with the position on the vehicle of the tire monitor which originated the transmission. In one example, the position information is manually entered by a service technician.

After collecting identification and position information for each of the tire monitors, the exciter 16 communicates the information to the receiving unit 14. Preferably, the data communication is over a hard-wired data link using the download link circuit 28. This hard-wired link is preferably a temporary connection made, for example, by briefly connecting the exciter 16 to the receiving unit 14. Alternatively, a wireless link may be made between the exciter 16 and the receiving unit 14. The hard wire connection may be preferable in a factory, where other radio frequency transmissions from tire monitors and exciters are occurring, in order to minimize interference and crosstalk.

Figure 2:
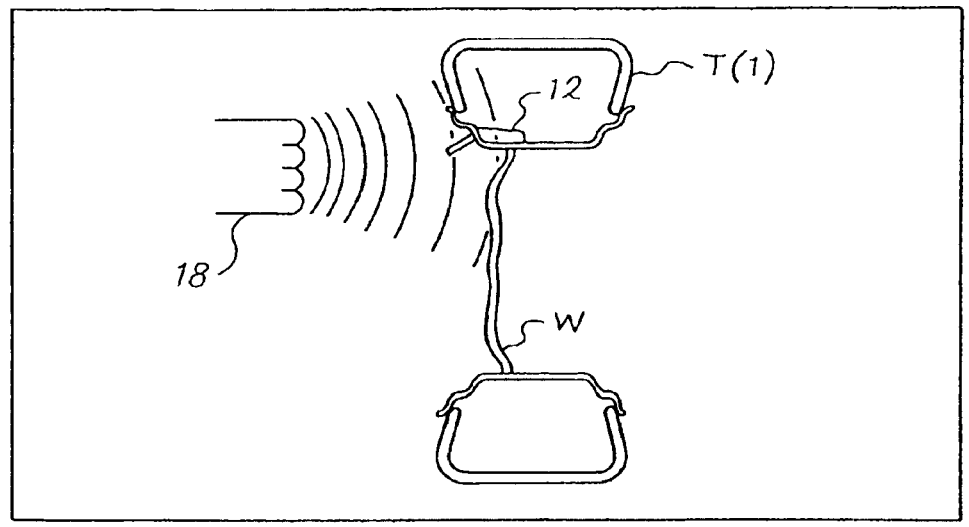
FIG. 2 is a cross sectional view of a wheel including a tire and tire monitor mounted thereon.

FIG. 2 is a cross sectional view of a tire T(1) mounted on a wheel W and an associated tire monitor 12 also mounted on the wheel W. In the illustrated embodiment, the tire monitor 12 is fabricated to include the valve stem which extends through the wheel W to permit filling and pressure checking of the tire T(1). Other mechanical embodiments and mounting methods for the tire monitor 12 may be substituted.

Figure 3:
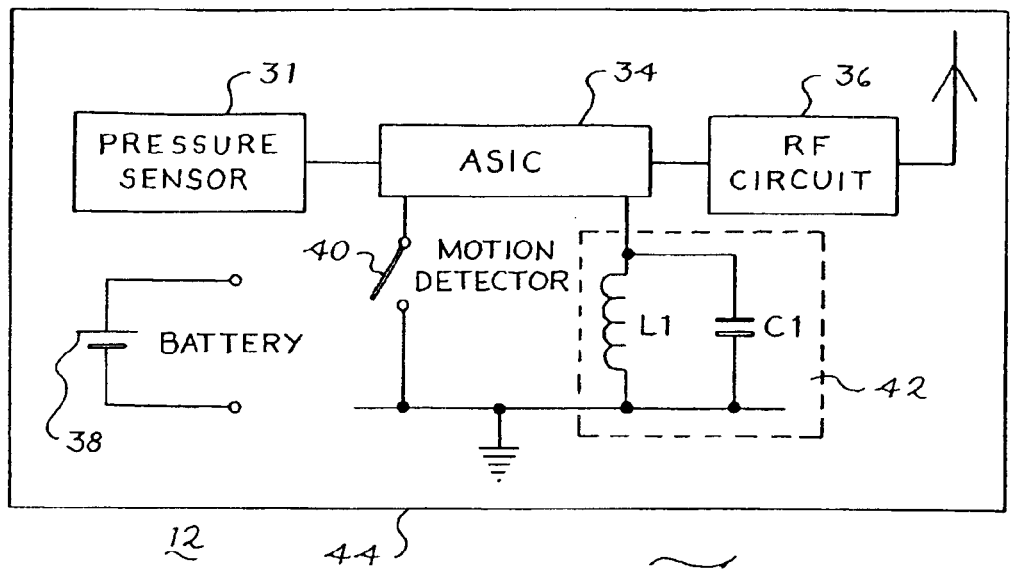
FIG. 3 is a block diagram of a tire monitor for use in the remote tire monitoring system of FIG. 1.

FIG. 3 shows a tire monitor 12 for use in the tire pressure monitoring system of FIG. 1. The tire monitor 12 is configured to be mounted in a tire of a vehicle, as shown in FIG. 2. The tire monitor 12 includes a sensor 32, a controller 34, a high frequency transmitter circuit 36, a battery 38, a motion detector switch 40 and a receiver circuit 42. The components of the tire monitor 12 are contained within a housing 44.

The sensor 32 detects a characteristic of the tire and produces a signal. In the illustrated embodiment, the sensor 32 is a pressure sensor which detects the air pressure of the tire and produces a signal representative of the air pressure. However, other tire characteristics may be detected, such as tire temperature or number of rotations of the tire.

The controller 34 controls operation of the tire monitor 12. In the illustrated embodiment, the controller 34 is implemented as an application specific integrated circuit (ASIC). Implementation as an ASIC provides advantages of reduced current drain, small size and light weight. However, the controller 34 may be alternatively implemented as hard wired logic or as a general purpose microcontroller operating in conjunction with specific circuitry and under software control.

The high frequency transmitter circuit 36 is configured to transmit a relatively high frequency signal in response to an activation signal received at the tire monitor 12. Any suitable data transmission or signal modulation technique may be used by the high frequency transmitter circuit. In the preferred embodiment, the high frequency transmitter circuit transmits a radio frequency signal at, for example, 315 MHz. Other frequencies or ranges of frequencies may be suitably used.

The battery 38 provides operating power for the tire monitor 12. In an alternative embodiment, the tire monitor 12 may be operated by power provided by energizing the low frequency receiver circuit 42. The motion detector 40 includes a switch which closes in response to motion of the tire monitor 12. The controller 34 responds to closure of the switch by varying the operational mode of the tire monitor 12.

The receiver circuit 42 is configured to respond to a relatively low frequency signal as the activation signal for the tire monitor 12. The receiver circuit 42 includes a tuned inductor coil L1 and an associated tuning capacitor C1. The values of the inductor L1 and capacitor C1 may be chosen so that the receiver circuit 42 resonates in response to a low frequency signal applied to the tire monitor 12 by the exciter of FIG. 1.

Figure 4:
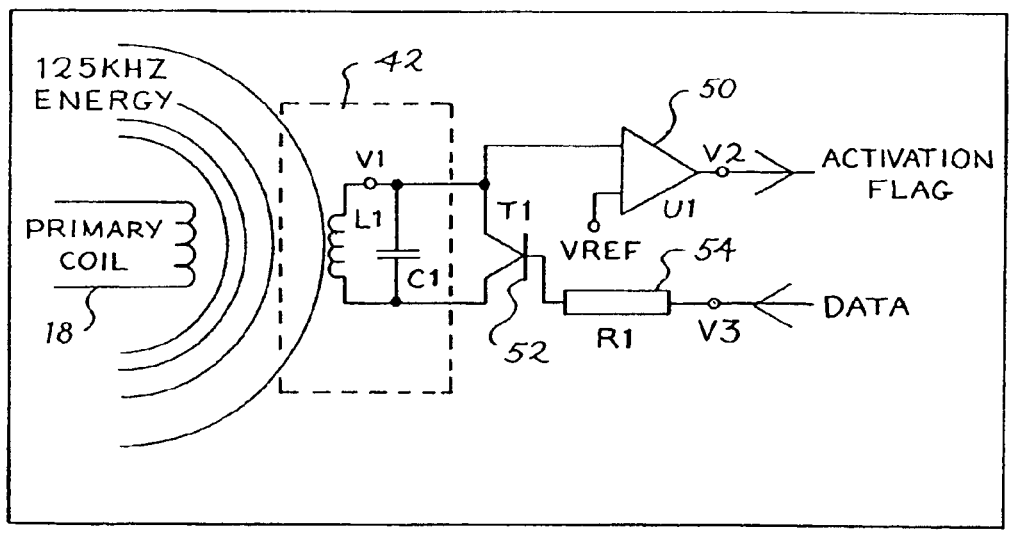
FIG. 4 is a schematic diagram of a portion of the tire monitor of FIG. 3.

FIG. 4 is a schematic diagram of a portion of the tire monitor 12 of FIG. 3. In FIG. 4, the receiver circuit 42 is shown along with a comparator 50, a transistor 52 and a resistor 54. The comparator 50, the transistor 52 and the resistor 54 are preferably embodied as a portion of the controller 34 (FIG. 3), but may be included separately in the tire monitor 12 and electrically cooperate with circuits of the controller 34.

Further shown in FIG. 4 is the primary coil 18 of an exciter such as exciter 16 (FIG. 1) which has been brought in proximity to the receiver circuit 42. The exciter 16 transmits a relatively low frequency signal, such as a signal at 125 KHz.

The primary coil 18, when driven with sufficient power and positioned in sufficiently close proximity, induces a resonant alternating current (AC) voltage V1 in the receiver circuit 42. V1 will vary in amplitude depending on the power level in the primary coil 18. The comparator 50 is used to detect when V1 rises high enough to initiate action of the tire monitor 12. When V1 is at a level equal to or higher than the threshold voltage, $V_{ref}$, the output of the comparator 50 changes state from low to high at V2. An exemplary level for $V_{ref}$ is 1.2 volts, although other suitable values may be used. The high level at V2 is used as an activation signal and is supplied to digital circuitry of the controller 34 (FIG. 3). In response to the high level, the controller 34 sends digital data to the high frequency transmit circuit 36. The digital data may include, for example, identification information for the tire monitor 12, tire pressure data and other data such as a function code, a battery level indication, etc. The high frequency transmit circuit 36 initiates a radio frequency (e.g., 315 MHz) transmission to convey the data.

In this manner, the primary coil 18 of the exciter 16 conveys a relatively low frequency signal to the secondary coil L1 of the tire monitor 12. In response to the relatively low frequency signal, the tire monitor 12 transmits a relatively high frequency signal to convey data. The relatively high frequency signal including the data is received at the exciter 16. Also at the exciter, the data may be associated with position information for the tire monitor on the vehicle.

Thus, in one embodiment, the exciter provides a relatively low frequency signal as an activation signal. In response, the tire monitor communicates tire monitor information using a relatively high frequency signal.

In other embodiments, the primary coil 18 of the exciter 16 and the coil L1 of the tire monitor 12 are used for duplex communications. In one embodiment, the tire monitor is passive and merely modulates the impedance seen by the primary coil 18. The modulation is detected by the primary coil, allowing tire monitor information to be communicated in this manner. In another embodiment, the tire monitor is active and the coil L1 is further used as a primary coil for conveying digital data to a secondary coil, coil 18 of the exciter 16.

In these embodiments, both the low-frequency interrogation signal from the coil 18 and response data from the coil L1 are transferred between the exciter 16 (FIG. 1) and the tire monitor 12 over a short air gap. The air gap is in one example only a few inches between the tire monitor on a tire and the exciter held or mounted nearby. The air gap in another example is approximately nine inches, where the exciter is mounted in the wheel well of the vehicle near the tire to be monitored. Other air gaps may be used, but in all cases the transmission distance will be substantially less than the transmission distance from the high frequency transmitter circuit 36 to the receiving unit, which is typically mounted near the instrument panel of the vehicle.

The passive, low frequency embodiment uses technology similar to that used in radio frequency identification (RF ID) tags. In this embodiment, digital data are conveyed by the controller 34 to node V3 (FIG. 4). In the illustrated embodiment, digital data on node V3 takes the form of low level voltages at 0 volts and high level voltages at 3 volts. Other suitable voltage levels may be used. During periods when 0 volts is applied, there is no effect. But when 3 volts is applied, during the high pulses of the digital data, transistor 52 is turned on by the base current supplied through the resistor 54 from node V3. When transistor 52 is turned on, it effectively short circuits the receiver circuit 42 to ground. The induced voltage at node V1 caused by the primary coil 18 is rapidly reduced to 0 volts. After the high voltage at node V3 is removed, node V1 rapidly restores to its high level, assuming the primary coil 18 is still present and energized. The controller 34 may be designed to provide suitable time delays to ensure that the data being transmitted to node V3 are not interrupted as the comparator voltage at node V2 switches state in reaction to switching at node V1. In this way, digital data is used to effectively turn on and off the induced voltage at node V1.

At the primary coil 18, this action of the transistor 52 shorting the receiver circuit 42 is seen as an effective impedance modulation of the radiated field of the primary coil 18. This causes small changes to the primary coil voltage level which can be detected and from which the digital, encoded data from the tire monitor 12 can be decoded and recovered at the exciter. Design of a receiver circuit capable of detecting the encoded data at the exciter is well within the skill of those ordinarily skilled in the art. Operated in this manner, the transistor 52 and resistor 54 along with the coil L1 form a low frequency duplex data communication circuit.

In the active low frequency embodiment, the operation of the primary coil 18 and the coil L1 are reversed. In this embodiment, the coil L1 is driven as a primary coil, radiating energy in a field that is detected by the coil 18, operated as a secondary coil. For duplex communication, the coils alternate serving as the primary coil in the system. This active embodiment has the advantage of increased range of communication at the expense of increased power dissipation in the battery of the tire monitor. Operated in this manner, the coil L1 thus forms a low frequency active duplex data communication circuit.

This low frequency duplex communication system may be used for programming the receiving unit of the vehicle with tire position data or for communication of all data by the tire monitor 12. The tire monitor is actuated by a low frequency (e.g., 125 KHz) transmission from the exciter and responds by communicating identification information at the low frequency. In this embodiment, all subsequent tire characteristic information, such as tire pressure data, is communicated to the receiving unit using relatively high frequency (e.g., 315 MHz) signals. In another embodiment, the tire monitor does not include a high frequency transmission circuit or does not use the high frequency communication circuit. After programming, tire characteristic information is communicated by a tire monitor modulating low frequency energy from a primary coil or actively radiating an energy field for detection at the exciter.

Use of low frequency communication for programming and standard data transmissions has the advantage of reducing crosstalk and interference among tire monitors when many such tire monitors are being assembled with wheels in a factory. Low frequency communication permits the elimination of the high frequency transmitter circuit 36, with duplex data communication through the coil L1. This provides added benefits of reduced current drain by the tire monitor and therefore longer battery life, as well as elimination or reduction of design concerns over RF transmitted power regulations and receiver positioning and sensitivity.

Figure 5:
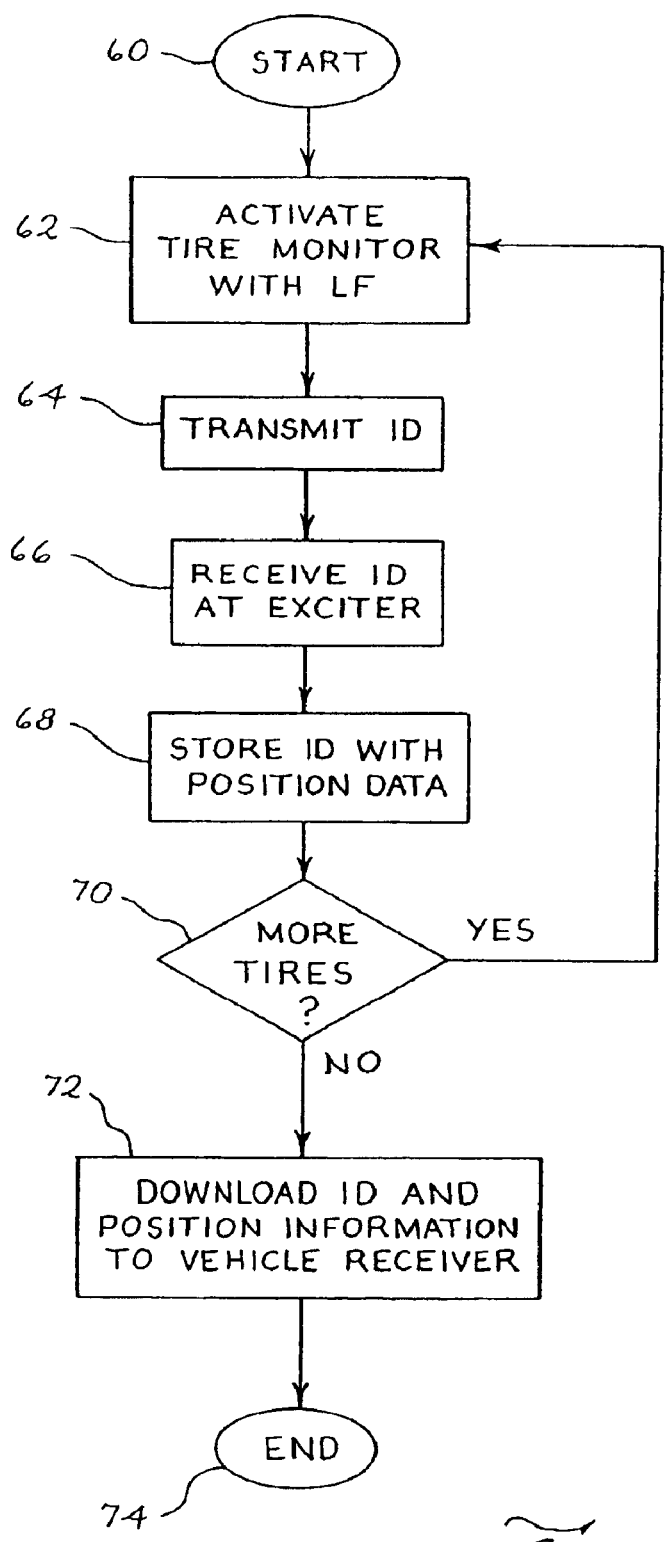
FIG. 5 is a flow diagram illustrating operation of the remote tire pressure monitoring system of FIG. 1.

FIG. 5 illustrates a method for operating the remote tire pressure monitoring system of FIG. 1. The method begins at step 60.

At step 62, an exciter activates a tire monitor associated with a tire using a low frequency signal. The primary coil of the exciter is brought near to the secondary coil of the tire monitor to actuate the tire monitor. In one embodiment, the exciter is a hand held unit carried by a service technician and brought near the tires of a vehicle during assembly or servicing of the vehicle. In another embodiment, the exciter is located in a stationary position in a car assembly factory. Wheels including tires and tire monitors are assembled and mounted on vehicles on the assembly line. As the vehicle moves past the exciter, low frequency energy is transmitted to the secondary coil of the tire monitor. The exciter may be positioned manually or automatically and may remain stationary or may move close to the tire as the tire passes to energize the secondary coil. One exciter may be located on each side of the vehicle as the vehicle moves on the assembly line. In another embodiment, the exciter may be temporarily mounted on or near the roof of the vehicle and positioned to be pulled down by an operator and manually positioned beside each wheel. The operator may, for example, press a button or otherwise activate the exciter to energize the tire monitor and provide an activation signal. In still a further embodiment, the exciter may be positioned on a conveyor belt that brings wheels or wheel assemblies into position for mounting on the vehicle. In this embodiment, the tire monitors are activated prior to mounting.

In response to the activation signal from the exciter, the tire monitor transmits data at step 64. Preferably, the data includes identification information for the tire monitor. In one example, 32 bits of data containing a unique identification value are transmitted. Other data including tire characteristic data may be transmitted at this time as well.

The data are received at the exciter at step 66. The exciter associates the received data with the position of the tire on the vehicle. For example, the exciter will sequentially associate received identification information with the left front tire, the left rear tire, the right rear tire, and the right front tire. The position data may be received manually or automatically. If the exciter is a hand held unit or is positioned manually by a service technician, the service technician can manually enter the position data using a keypad or other data entry mechanism. If the exciter is positioned automatically, for example, using computer control, the automatic mechanism will relate the position of the exciter at the time the identification information is received with tire position for the vehicle. At step 68, the identification information is stored at the exciter along with the associated position data.

At step 70, the method determines if there are more tires for the vehicle from which data must be received. In the exemplary embodiment of FIG. 1, the vehicle V includes four tires. In other applications, the remote tire monitoring system 10 may be used on a truck having 18 or more tires. If more tires are present, control returns to step 62 to activate a next tire monitor. If no additional tires remain, at step 72 the stored identification information and position data are downloaded to the receiving unit of the vehicle. The receiving unit stores the information for future reference. For example, as the vehicle is operated, each tire monitor of the vehicle will occasionally transmit tire characteristic data, such as tire pressure information. In addition to the tire characteristic data, the tire monitor will also transmit data indicative to its identification information. Upon receipt of the data indicative of identification information, the receiving unit can compare the data with the previously stored identification data to determine the source of the associated tire characteristic data. The receiving unit can then provide an operator of the vehicle with a warning or display that identifies which tire of the vehicle transmitted the data. This is particularly useful if the data indicates, for example, a low tire pressure condition. In this instance, the operator of the vehicle can immediately identify which tire has a problem and take corrective steps.

The method illustrated in FIG. 5 is particularly useful after any change in tire position. Such a change may occur, for example, after rotation of the tires of the vehicle or upon replacement of a tire in a vehicle servicing environment. After a change in tire position, the method of step 64 may be executed in order to program the receiving unit of the vehicle with the tire position information for each tire. If a tire position has been changed, the tire position will be updated correctly to reflect the change. In this manner, future received tire characteristic information can be accurately displayed for the user of the vehicle.

Figure 6:
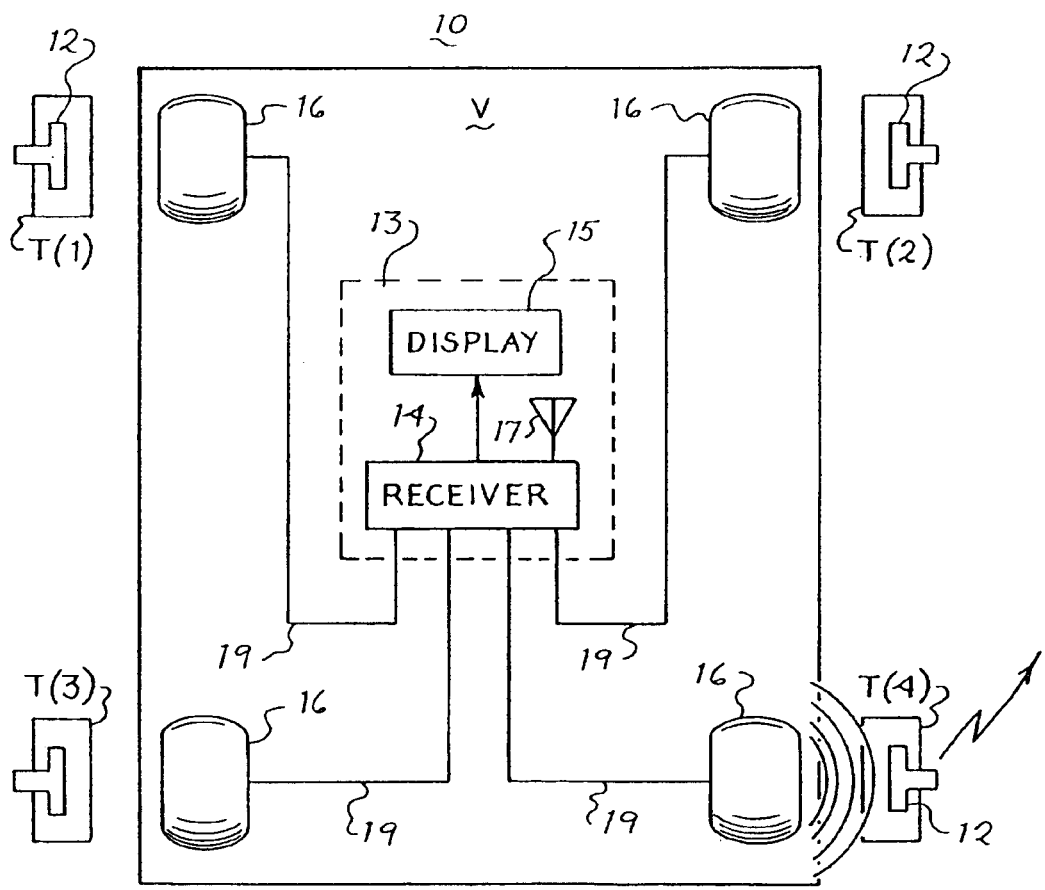
FIG. 6 is a block diagram of an alternative embodiment of a remote tire pressure monitoring system.

FIG. 6 shows a block diagram of an alternative embodiment of a remote tire pressure monitoring system 10. The system 10 includes a plurality of tire monitors 12, a controller 13 and a plurality of exciters 16. Each tire monitor 12 is associated with a tire of the vehicle V. The tires are designated T(1), T(2), T(3) and T(4). Each tire monitor includes a sensor which produces data indicative of a tire characteristic and a transmitter circuit coupled to the sensor and configured to transmit a relatively high frequency signal in response to an activation signal.

The controller 13 provides tire characteristic information to a user. The controller includes a receiver circuit 14 configured to receive the relatively high frequency signal, an antenna and a display 15. In response to data received at the receiver circuit 14, a display is provided on the display 15 to provide information about tire characteristics to the operator of the vehicle.

The exciters 16 are electrically coupled to the controller 13. Each exciter 16 is located on the vehicle V near an associated tire monitor 12. Each exciter 16 includes a transmission circuit configured to transmit, in response to a control signal from the controller 13, a relatively low frequency signal as the activation signal for the associated tire monitor 12. In the illustrated embodiment, each exciter 16 is connected via a wire with the controller 13. Communication over the wire link 19 is preferably two way.

In the embodiment of FIG. 6, the primary coil of each exciter 16 is not fixed or hand held, but is mounted to the wheel well area of the vehicle V and as such is permanently mounted close to the respective tire monitor 12. In a vehicle such as a car, there are four wheel well mounted primary coils, which can each activate and interrogate the associated tire monitor 12. This allows automatic wheel information collection by means of polling each tire monitor 12.

For example, the polling process may include the following cycle. At the start of the cycle, the left front primary coil of the exciter 16 is energized. The tire monitor 12 in the left front wheel is thereby activated and subsequently transmits the wheel pressure and identification information which is picked up by the receiver circuit 14 of the controller 13. The controller 13 then allocates the received data to the left front wheel. Next, the right front wheel primary coil of the exciter 16 is energized by the controller 13 and the subsequent received data from the right front tire monitor 12 is allocated in memory to that wheel position. The cycle continues and polls each wheel in turn so that all identification codes are received and allocated to the respective wheels. In this embodiment, it is not required that the transmitted signals from the tire monitors 12 include identification information, since individual tire monitors 12 are selectively activated by the controller 13.

In one embodiment, the transmission of data from each tire monitor is a normal tire monitor radio frequency transmission, for example, at approximately 315 MHz. This transmission is received by the centrally mounted receiver circuit 14 using the antenna 17. In an alternative embodiment, the data can be transmitted by the tire monitor 12 using a low frequency signal, as described in connection with FIG. 4, at, for example, 125 KHz. The transmission is received by each individual primary coil of the exciter 16 at the wheel well and conveyed to the controller 13 using the wire 19.

When all four identification codes have been received, the controller 13 uses the data to allocate subsequent pressure data transmissions to the respective wheel. When the wheels V are removed and put back in different positions, for example for tire rotation purposes, at the first journey afterwards, the above described sequence is carried out and each tire monitor identification code is assigned to its new wheel position. In this manner, wheel position information is automatically provided to the controller 13.

From the foregoing it can be seen that the present invention provides an improved remote tire pressure monitoring system and method. A tire monitor associated with a tire of a vehicle is activated by a low frequency signal from an exciter and responds by transmitting a signal containing tire characteristic data. The tire characteristic data includes, for example, identification information for the tire monitor. The transmitted data are received at the exciter and subsequently downloaded to a controller or receiving unit at the vehicle, or alternately at the controller, to locate individual tire monitors. In this manner, the programming process can be automated and interference and crosstalk are reduced or eliminated.

While a particular embodiment of the present invention has been shown and described, modifications may be made.

For example, frequencies of activation and communication different from those mentioned above may be readily substituted. Also, the battery of the tire monitor may be eliminated and the tire monitor powered by the received low frequency signal which energizes the secondary coil of the tire monitor. It is therefore intended in the appended claims to cover all such changes and modifications which fall within the true spirit and scope of the invention.

What is claimed is:

1. A programming method for a remote tire monitor system of a vehicle, the method comprising:
   (a) applying a relatively low frequency activation signal from an exciter positioned proximate the vehicle to a coil of a tire monitor of the vehicle;
   (b) at the exciter, detecting a data signal from the tire monitor, the data signal produced by modulating a relatively low frequency tire monitor signal with tire data produced in response to a measured tire parameter;
   (c) at the exciter, receiving the tire data from the data signal;
   (d) downloading the tire data from the exciter to a receiving unit of the vehicle.

2. The method of claim 1 further comprising; associating the tire data with position information for the tire monitor on the vehicle; and downloading the position information with the tire data from the exciter to the receiving unit of the vehicle.

3. The method of claim 1 further comprising; repeating acts (a), (b) and (c) for all tires of the vehicle.

4. A programming method for a remote tire monitor system of a vehicle, the method comprising:
   (a) applying a relatively low frequency activation signal from an exciter positioned proximate the vehicle to a coil of a tire monitor of the vehicle;
   (b) at the exciter, detecting a data signal from the tire monitor, the data signal produced by modulating a relatively low frequency tire monitor signal with tire data produced in response to a measured tire parameter;
   (c) at the exciter, receiving the tire data from the data signal;
   (d) associating the tire data with position information for the tire monitor on the vehicle; and
   (e) downloading the tire data and position information from the exciter to a receiving unit of the vehicle.

5. The method of claim 4 further comprising; repeating acts (a), (b), (c) and (d) for all tires of the vehicle.

6. The method of claim 5 wherein applying a relatively low frequency activation signal comprises:
   positioning the exciter in a substantially stationary position in a car assembly factory; and
   as the vehicle including the tire monitor moves past the substantially stationary position, transmitting relatively low frequency energy from a primary coil of the exciter to the coil of the tire monitor to actuate the tire monitor with the relatively low frequency signal.

7. The method of claim 4 wherein applying a relatively low frequency activation signal comprises applying an unmodulated signal having a frequency chosen to resonate with the coil of the tire monitor.

8. The method of claim 4 wherein downloading the tire data and position information comprises:
   establishing a temporary connection between the exciter and the receiving unit;
   conveying data including the tire data from the exciter to the receiving unit over the temporary connection; and
   breaking the temporary connection.

9. The method of claim 4 wherein detecting the data signal comprises:
   detecting an impedance modulation of a radiated field of a primary coil of the exciter; and
   decoding data encoded as the impedance modulation by operation of the tire monitor.

10. The method of claim 4 wherein detecting the data signal comprises:
    detecting at a primary coil of the exciter relatively low frequency energy radiated by the coil of the tire monitor, the coil being driven with the tire data to produce the radiated energy.

11. A tire monitor configured to be mounted on a tire of a vehicle, the tire monitor comprising:
    a coil resonant with a relatively low frequency signal applied to the coil from an exciter positioned proximate the vehicle;
    a detection circuit coupled to the coil and configured to produce an activation signal in response to resonance of the coil with the relatively low frequency activation signal applied to the coil;
    a sensor to detect a characteristic of the tire and produce a sensor signal;
    a controller responsive to the activation signal to initiate a data transmission from the tire monitor based at least in part on the sensor signal; and
    a high frequency communication circuit coupled to the controller to communicate a relatively high frequency signal including data related to the characteristic of the tire provided to the high frequency communication circuit from the controller.

12. The tire monitor of claim 11 wherein the coil and the detection circuit in combination are responsive to an energy field from an adjacent primary coil to produce an induced alternating current (AC) voltage conveying the activation signal to the controller.

13. The tire monitor of claim 11 further comprising a low frequency communication circuit coupled to the controller and the coil and responsive to data from the controller to provide a signal to the coil to vary electrical properties of the coil and convey data from the tire monitor to a data reception coil of the exciter.

14. The tire monitor of claim 13 wherein the tire monitor conveys identification information for the tire monitor using one of the low frequency communication circuit and the high frequency communication circuit.

15. A tire monitor configured to be mounted on a tire of a vehicle, the tire monitor comprising:
    a controller;
    a sensor coupled to the controller to produce a signal based on a sensed characteristic of the tire;
    a low frequency duplex communication circuit for wireless communication with an exciter positioned proximate the tire monitor, the low frequency duplex communication circuit including:
    a coil,
    a receiver circuit coupled to the coil and the controller and responsive to a relatively low frequency interrogation signal from the exciter to generate an activation signal for the controller, and
    a transmitter circuit coupled to the controller and the coil and responsive to digital data from the controller to convey response data from the tire monitor to the exciter; and a high frequency communication circuit coupled to the controller to communicate a relatively high frequency signal including data related to the sensed characteristic of the tire provided to the high frequency communication circuit from the controller.

16. The tire monitor of claim 15 wherein the transmitter circuit comprises one or more components responsive to the digital data from the controller to modulate impedance seen by a primary coil of the exciter.

17. The tire monitor of claim 15 wherein the coil alternates with a coil of the exciter serving as primary coil of a relatively low frequency duplex communication system, during a first time period the coil serving as a secondary coil to receive the interrogation signal, during a second time period the coil serving as the primary coil to convey the response data to the coil of the exciter.

* * * * *